Patented May 8, 1945

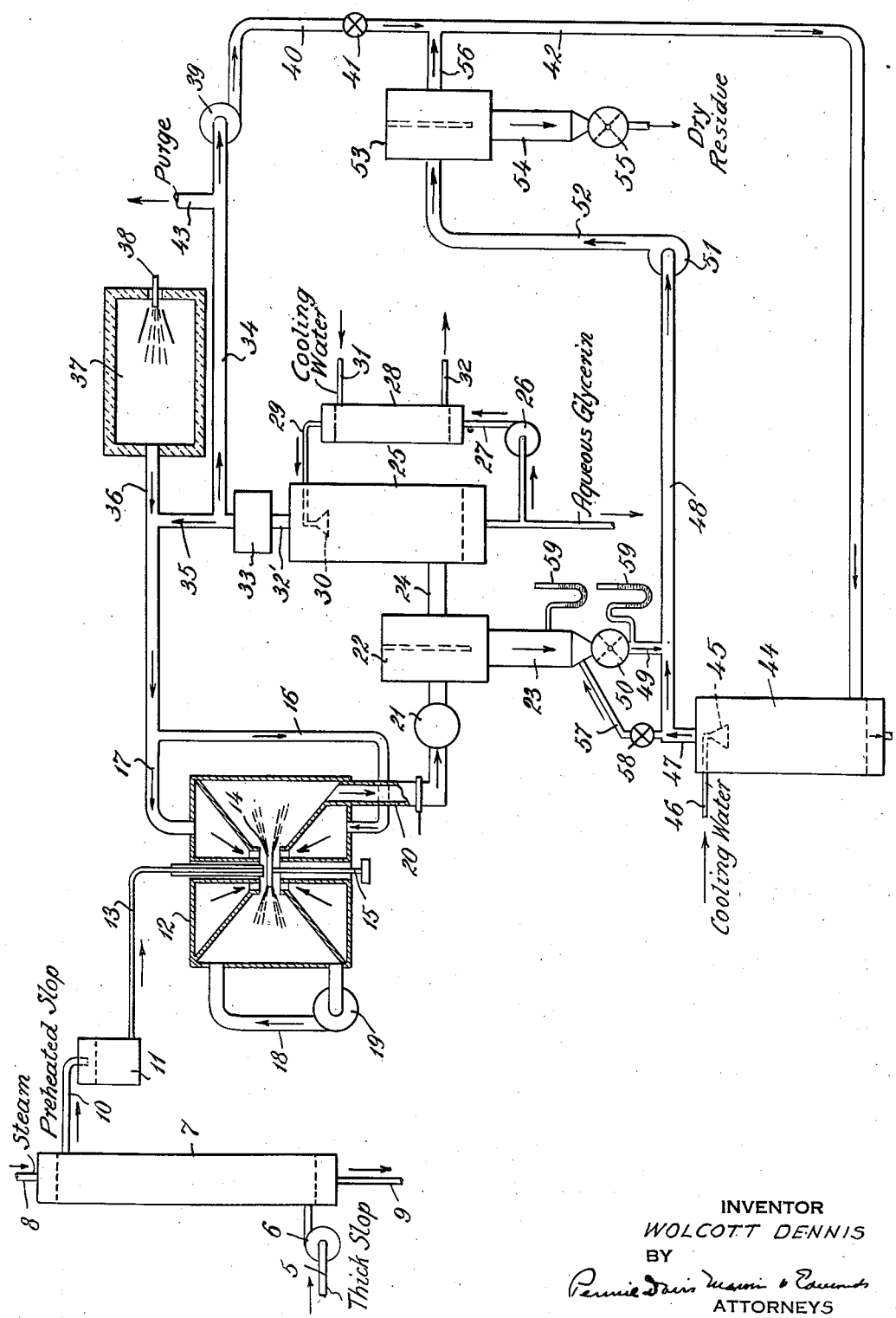

2,375,288

UNITED STATES PATENT OFFICE 2,375,288

METHOD OF TREATING FERMENTATION RESIDUES

Wolcott Dennis, Darien, Conn., assignor, by mesne assignments, to U. S. Industrial Chemicals, Inc., a corporation of Delaware Application December 31, 1942, Serial No. 470,798

13 Claims. (Cl. 202—49)

This invention relates to the recovery of valuable products from fermentation residues containing high boiling constituents such as glycerin, butylene, ethylene and propylene glycols, lactic acid, etc., and solid materials which are useful in fertilizers, animal and poultry feeds and for other purposes.

It is well known that the fermentation, for example of molasses, can be carried out to produce primarily ethyl alcohol with a relatively small proportion of glycerin. It can be conducted also to produce butyl alcohol, acetone, butylene, and other glycols, lactic acid and similar products. Essentially the present invention is directed to the recovery of valuable products from fermentation residues and particularly from the slop resulting from a fermentation conducted to produce ethyl alcohol and glycerin. In such fermentations there is produced a fermented mash or beer containing around 3% of glycerin, 6% of alcohol, and 7–8% of solids, the remainder being water. In the usual procedure, the alcohol is removed from the beer by distillation and the remaining product, called thin slop, is concentrated to a heavy liquid known as thick slop and containing up to about 15% of glycerin, up to 50% solids, the remainder being water.

The disposal of thick slop, whether from ethyl alcohol-glycerin fermentation, or from some similar operation, has long been a difficult problem. Heretofore the slop has been disposed of principally by running it into sewage systems, although in most localities this form of disposal is now forbidden. Various attempts have been made to use the slop as a fertilizer, as a feed material, and for other purposes, but on the whole such attempts have not been successful. Various attempts have been made also to recover the glycerin content, particularly in the slop from an alcohol-glycerin fermentation, but under the methods proposed heretofore the cost per unit of glycerin recovered has been too high and the solids have not been in a satisfactory condition for transportation and use.

In an application Ser. No. 403,837, filed August 29, 1941, now Patent No. 2,347,669, I have described a process of recovering a dry product and also a high boiling constituent such as glycerin from fermentation residue by spraying the fermentation residue into a stream of inert gas at a temperature not substantially lower than 900° F., thereafter separating the dry product from the gas stream while the temperature is above the point at which condensation of the volatile products can occur, and finally condensing the high boiling constituent. The operation as described in my application has proved to be highly successful when the conditions described in my pending application are maintained.

It is the object of the present invention to afford further improvements in the operation involving particularly the cooling of the solids before discharge thereof into atmospheric air, thus preventing any possibility of spontaneous combustion of the organic matter present.

Another object of the invention is the prevention of leakage or diffusion of the gases containing high boiling constituents to points where condensation of such constituents might interfere with the desired operation.

Other objects and advantages of the invention will be apparent as it is better understood by reference to the following specification and the accompanying drawing, which illustrates diagrammatically apparatus suitable for the practice of the invention.

In accordance with the invention, the high boiling material, e. g., glycerin, is recovered from the concentrated slop, and the solids in the slop are obtained as a dry, odorless powder by atomizing the thick slop into a current of hot inert gas or vapor at a sufficiently high temperature to vaporize and carry from the distillation zone in vapor form substantially all of the water and glycerin which the slop contains and also to subject the solids to a temperature sufficiently high to cause a limited decomposition with the evolution of some oxides of carbon, but without serious loss of nitrogen. This limited decomposition results in the irreversible dehydration of the solids which on cooling are in the form of a powder composed of relatively hard, discrete particles which will not reabsorb water from the air to any substantial extent even under conditions of widely fluctuating relative humidity.

In the operation, the thick slop is sprayed or atomized into the stream of hot inert gas at or about the point of introduction of the gas into the distillation chamber so that the aqueous liquid comes into contact with the hottest portion of the gas with resulting extremely rapid vaporization of the water and glycerin and simultaneous cooling of the hot gas to the point where undesired decomposition, either of the glycerin or solids, is avoided. It is essential in this operation that the inert gas used to supply the heat required for vaporizing the water and glycerin be at a sufficiently high temperature and in sufficient quantity to ensure not only the extremely rapid evaporation of the water and glycerin but also the production of a thoroughly dried residue. The minimum temperature of the gas is about 900° F., and at such temperatures a large volume of gas is required per unit of thick slop treated. The best results are usually obtained by employing a gas or vapor at a temperature of from 1100 to 1500° F., and even higher temperatures may be used successfully. The quantity of gas used per unit of thick slop treated will vary depending upon its temperature and the water and glycerin content of the slop, but must be such that the temperature of the exit gases and vapors from the distilling chamber is high enough to prevent condensation of the glycerin or other high boiling material present in the slop. Where the operation is carried out to recover glycerin, this temperature will be at least 375° F., and best results are obtained when the temperature is around 480–525° F. Where glycols are recovered, the temperature may be lower, as the condensation temperatures for the lower glycols are less than those of glycerin. The exit temperature may be even higher than 525° F., but it is usually uneconomical to maintain exit temperatures higher than necessary.

The exit gases include water vapor, the vapors of the high boiling material, e. g., glycerin vapor, the heating gas, and whatever gaseous products of decomposition, which are relatively small in amount, are formed, and the gases usually carry the dry residue. While the exit gases still are at a sufficiently high temperature to prevent condensation, they are passed through a dust separator for the separation of the dry residue which is recovered as hereinafter described. The remaining gases and vapors are then cooled and treated to recover the glycerin or other condensible constituent therefrom.

Various inert gases or vapors may be used as the heating gas, including superheated steam, nitrogen, carbon dioxide, etc., but for reasons of economy, the operation will be conducted ordinarily with furnace gases resulting from the burning of fuel, e. g., gas or oil, with an amount of air calculated to afford combustion gases containing very little, if any, oxygen. Oxygen in the heatingg as is objectionable both because of its effect on the glycerin and because of the hazard resulting from the suspension of the large quantity of solids in finely divided form in a gas stream containing any substantial amount of oxygen at the high temperature necessarily used in the operation.

As the combustion gases from an oil or gas burner are at a considerably higher temperature than that required for the opertaion, they are advantageously tempered by recycling a portion of the exit gases after removal of the solids and the glycerin or other condensible constituent therefrom and the cooling incidental to such removal. The proportion of the exit gases so recycled is calculated to maintain a substantially constant flow of heated gas at the required temperature to the distilling chamber, an amount equivalent to the furnace comustion gases and any fixed or uncondensed gases or vapors evolved in the distillation being purged.

The operation is advantageously carried out at atmospheric pressure as quite complete recovery of the glycerin can be obtained under these conditions with satisfactory separation of the solids in the desired form, but higher or lower pressures may be used. Operation at atmospheric pressure avoids both the expense and hazard involved in operating under vacuum as the special and large equipment required for vacuum operation is not necessary and there is no danger of explosion due to air leaks into the system.

The particular improvements effected in accordance with the present invention relate to the cooling of the solids and the prevention of diffusion or leakage of gas carrying condensible constituents into parts of the system where its presence is undesirable. This is accomplished by circulation of an inert gas, preferably a part of the gas from which the solids and glycerin or other condensible constituent have been withdrawn, the cooling of this gas and the use thereof to cool and convey the solids to the final separation. The solids cooled in an inert atmosphere are below the temperature at which spontaneous combustion could occur before they are delivered and come into contact with atmospheric oxygen. Sufficient cooled inert gas is introduced at the delivery exit of the initial separator so that gas carrying condensible constituents is prevented from escaping with the solids as they are delivered. Thus wetting of the cooling solid with condensed glycerin or other condensible constituent is avoided.

Referring to the drawing, the thick slop is introduced through a pipe 5 and pump 6 to a preheater 7. Heating may be effected by the introduction of steam or other heating media through a pipe 8. After passing through the preheater, the heating media escape through a pipe 9. The preheated slop is delivered by a pipe 10 to a feed tank 11 which supplies the slop by gravity to the distilling apparatus 12 through a pipe 13. The distilling apparatus illustrated is sold by Western Precipitation Corporation under the trade name of "Turbulaire Spray Dryer." Other types of co-current spray drying apparatus may be utilized, but the apparatus shown is most effective for the purpose of the invention.

The distilling apparatus includes a rapidly rotating atomizing disc 14 positioned within the chamber 12 and driven through a shaft 15 from any suitable source of power. The disc is rotated at a suitable speed to give the necessary fine spray of the material fed thereto through the pipe 13.

Hot combustion gases produced and tempered as hereinafter described are introduced to the distilling chamber close to the atomizer 14 through the conduits 16 and 17, the direction of flow being such as to cause the gases to follow a spiral path through the chamber, the atomized liquid being thrown directly into the path of the extremely hot gases. The gases, vapors and suspended matter are, to a considerable extent, carried through a duct 18 and blower 19 to recirculate them and thereby increase the time of suspension of the atomized material in the hot gases.

The gases and suspended matter are drawn off from the chamber through a conduit 20 by a blower 21 and are delivered to a separator 22 which may be of any suitable type adapted to effect the separation of the suspended solids from the gases and vapors. The well known cyclone separator is adapted for the purpose, as are various similar devices. The conduit 20 and the separator 22 must, of course, be efficiently insulated to prevent any substantial drop in temperature of the gases to a point which would permit precipitation of the glycerin or other condensible constituent. The solids drop into the receptacle 23 at the bottom of the separator and are removed as hereinafter described.

The gases and vapors escape from the separator 22 through a conduit 24 to a tower 25 through which water containing glycerin or other condensible constituents separated from the gases is circulated by a pump 26 through a pipe 27 and cooler 28 from which it is delivered through a pipe 29 to a spray head 30. Cooling water is supplied through a pipe 31 and withdrawn through a pipe 32. The gases and vapors being thus subjected to the cooling spray are reduced to a temperature which permits condensation of the glycerin or other condensible constituent. A part of the aqueous glycerin is withdrawn through a pipe 60 for further treatment while the balance is recirculated as previously described. The gases with any remaining vapors escape through a pipe 32' to a separator 33 to remove any entrained liquid. The gases freed from condensible constituents escape through a pipe 34, a portion thereof being diverted to the pipe 17 where they mingle with the hot gases supplied through a pipe 36 from a combustion chamber 37 and burner 38.

As hereinbefore indicated, the burner 38 is operated with a suitable fuel such as oil or gas and a limited amount of air, so as to produce a hot combustion gas substantially free from oxygen. The temperature of the combustion gas is necessarily much higher than that required in the distilling chamber. A sufficient amount of the gas freed from condensible constituents is introduced through the pipe 35 to temper the combination gas and to supply the volume of heating gas required at the desired temperature.

A portion of the gas in the pipe 34 is withdrawn through a blower 39 and introduced through a pipe 40 and valve 41 to a pipe 42 in which gas is maintained in circulation. The remainder of the gas from the pipe 34 is purged through a pipe 43.

The pipe 42 delivers the gas to a cooler 44 in which it is subjected to a spray of water introduced through the head 45 from a pipe 46. The temperature of the water is as low as possible and preferably below atmospheric temperature, so that the gas is cooled substantially and its relative humidity is reduced. The cooled gas escapes through a pipe 47 to a pipe 48 which is connected by a pipe 49 to a valve 50 through which the solids are withdrawn from the receptacle 23. The solids thus fall into the stream of cool inert gas in the pipe 48 and are delivered through a blower 51 and pipe 52 to a suitable separator 53 of the cyclone or other type. The solids fall into a receptacle 54 and are withdrawn through a valve 55 as a dry residue at a temperature sufficiently low to prevent spontaneous combustion. The inert gas is withdrawn through a pipe 56 and returned to the pipe 42 through which it is recirculated in the system. As will be apparent, it is necessary to introduce only sufficient gas through the pipe 40 to maintain the desired volume of inert gas in circulation and to ensure a pressure in the circulating system at least equal to that in the chamber 23.

To avoid leakage of gas containing condensible constituents from the chamber 23, a pipe 57 controlled by a valve 58 continuously delivers cooled inert gas from the pipe 47 to the receptacle 23. Pressure gauges 59 indicate the relative pressures in the chamber 23 and the pipe 49 so that the operator may constantly maintain the desired conditions. Such conditions are important because the solids which separate have a low heat capacity and ordinarily cool to about 150° C. in the receptacle 23 even though the latter is insulated. At this temperature glycerin will readily condense on the solids. The introduction of the cooled inert gas avoids this difficulty.

For a typical operation in the treatment of a slop containing about 15% glycerin and 50% solids, the distilling chamber may be about 12 feet in diameter and 8 feet high, with the atomizer, pumps, etc., of suitable capacity for the treatment of about 3,000 pounds of slop per hour. The hot gases may be introduced at a temperature of about 1200° F. in sufficient quantity to maintain the exit temperature at 480° F., the feed being preheated to 200° F. About 4 to 5 pounds of tempered combustion gases will be required for each pound of feed, and the quantity of combustion gases can be calculated readily when the temperature of the recycled gas and the temperature of the combustion gases are known. This will depend upon operation conditions, furnace design, etc., and cannot well be specified. Under such conditions, nearly all of the glycerin in the slop will be recovered, and the solid residue will be obtained as a dry, odorless powder having distinct value as a source of nitrogen, potash and certain growth factors for fertilizing purposes. It is an important advantage of the present invention that the residue is in the form of a powder which, in the presence of humid atmospheres, does not revert to a sticky or gummy mass, but retains its form as a mass of dry, discrete particles.

While the invention has been described with particular reference to the recovery of glycerin from distillery slop resulting from an alcohol-glycerin fermentation, it may be applied to similar materials, and various changes may be made in the form and arrangement of the apparatus and in the procedure as described without departing from the invention or sacrificing the advantage thereof.

I claim:

1. The method of recovering a dry product from fermentation residue which comprises spraying the fermentation residue into a stream of inert gas at a temperature not substantially lower than 900° F. to provide solid and vaporized volatile products, separating the solids from the gas stream while the temperature is above the point at which condensation of volatile products therein can occur, cooling the gas stream after separation of the solids therefrom sufficiently to separate the volatile products, circulating and cooling a second stream of inert gas, discharging the separated solids into the second stream, conveying the separated solids therein and finally separating the solids therefrom.

2. The method of recovering a dry product from fermentation residue which comprises spraying the fermentation residue into a stream of inert gas at a temperature not substantially lower than 900° F. to provide solid and vaporized volatile products, separating the solids from the gas stream while the temperature is above the point at which condensation of volatile products therein can occur, cooling the gas stream after separation of the solids therefrom sufficiently to separate the volatile products, circulating and cooling a second stream of inert gas, supplying additional gas as required to the second stream from the first after separation of volatile products therefrom, discharging the separated solids into the second stream, conveying the separated solids therein and finally separating the solids therefrom.

3. The method of recovering a dry product from fermentation residue which comprises spraying the fermentation residue into a stream of inert gas at a temperature not substantially lower than 900° F. to provide solid and vaporized volatile products, separating the solids from the gas stream while the temperature is above the point at which condensation of volatile products therein can occur, cooling the gas stream after separation of the solids therefrom sufficiently to separate the volatile products, circulating and cooling a second stream of inert gas at a pressure at least equal to the pressure of the first gas stream, discharging the separated solids into the second stream conveying the separated solids therein and finally separating the solids therefrom.

4. The method of recovering a dry product from fermentation residue which comprises spraying the fermentation residue into a stream of inert gas at a temperature not substantially lower than 900° F. to provide solid and vaporized volatile products, separating the solids from the gas stream while the temperature is above the point at which condensation of volatile products therein can occur, cooling the gas stream after separation of the solids therefrom sufficiently to separate the volatile products, circulating and cooling a second stream of inert gas by contact with water preferably below atmospheric temperature, discharging the separated solids into the second stream, conveying the separated solids therein and finally separating the solids therefrom.

5. The method of recovering a dry product from fermentation residue which comprises spraying the fermentation residue into a stream of inert gas at a temperature not substantially lower than 900° F. to provide solid and vaporized volatile products, separating the solids from the gas stream while the temperature is above the point at which condensation of volatile products therein can occur, cooling the gas stream after separation of the solids therefrom sufficiently to separate the volatile products, circulating and cooling a second stream of inert gas, preventing leakage of the first stream with the separated solids by baffling with a portion of the second stream, discharging the separated solids into the second stream, and finally separating the solids therefrom.

6. The method of recovering a dry product from fermentation residue which comprises spraying the fermentation residue into a stream of inert gas at a temperature not substantially lower than 900° F. to provide solid and vaporized volatile products, separating the solids from the gas stream while the temperature is above the point at which condensation of volatile products therein can occur, cooling the gas stream after separation of the solids therefrom sufficiently to separate the volatile products, circulating and cooling a second stream of inert gas at a pressure at least equal to the pressure of the first gas stream, preventing leakage of the first stream with the separated solids by baffling with a portion of the second stream, discharging the separated solids into the second stream and finally separating the solids therefrom.

7. The method of recovering a dry product from fermentation residue containing glycerin which comprises spraying the fermentation residue into a stream of inert gas at a temperature not substantially lower than 900° F. to provide solid and vaporized glycerin products, separating the solids from the gas stream while the temperature is above the point at which glycerin will condense, cooling the gas stream after separation of the solids therefrom sufficiently to separate glycerine, circulating and cooling a second stream of inert gas, discharging the separated solids into the second stream, conveying the separated solids therein and finally separating the solids therefrom.

8. The method of recovering a dry product from fermentation residue containing glycerin which comprises spraying the fermentation residue into a stream of inert gas at a temperature not substantially lower than 900° F. to provide solid and vaporized glycerin products, separating the solids from the gas stream while the temperature is above the point at which glycerin will condense, cooling the gas stream after separation of the solids therefrom sufficiently to separate glycerin, circulating and cooling a second stream of inert gas, at a pressure at least equal to the pressure of the first gas stream, discharging the separated solids into the second stream, conveying the separated solids therein and finally separating the solids therefrom.

9. The method of recovering a dry product from fermentation residue containing glycerin which comprises spraying the fermentation residue into a stream of inert gas at a temperature not substantially lower than 900° F. to provide solid and vaporized glycerin products, separating the solids from the gas stream while the temperature is above the point at which glycerin will condense, cooling the gas stream after separation of the solids therefrom sufficiently to separate glycerin, circulating and cooling a second stream of inert gas by contact with water preferably below atmospheric temperature, discharging the separated solids into the second stream, conveying the separated solids therein and finally separating the solids therefrom.

10. The method of recovering a dry product from fermentation residue containing glycerin which comprises spraying the fermentation residue into a stream of inert gas at a temperature not substantially lower than 900° F. to provide solid and vaporized glycerin products, separating the solids from the gas stream while the temperature is above the point at which glycerin will condense, cooling the gas stream after separation of the solids therefrom sufficiently to separate glycerin, circulating and cooling a second stream of inert gas, preventing leakage of the first stream with the separated solids by baffling with a portion of the second stream, discharging the separated solids into the second stream and finally separating the solids therefrom.

11. The method of recovering a dry product from fermentation residue which comprises spraying the fermentation residue into a concurrent stream of inert gas at a temperature not substantially lower than 900° F. in a distillation zone to distill volatile constituents therefrom and to provide a solid residue, withdrawing the solid residue from the distillation zone suspended in the inert gas and the vaporized volatile products of the distillation, separating the solids from the inert gas and the vaporized volatile products while the temperature is above that at which condensation of the vaporized volatile products can occur, thereafter separating the vaporized volatile products from the inert gas, circulating and cooling a second stream of inert gas, discharging the separated solids into the second stream, conveying the separated solids therein and finally separating the solids therefrom.

12. The method of recovering a dry product from fermentation residue which comprises spraying the fermentation residue into a concurrent stream of inert gas at a temperature not substantially lower than 900° F. in a distillation zone to distill volatile constituents therefrom and to provide a solid residue, withdrawing the solid residue from the distillation zone suspended in the inert gas and the vaporized volatile products of the distillation, separating the solids from the inert gas and the vaporized volatile products while the temperature is above that at which condensation of the vaporized volatile products can occur, cooling the stream of inert gas and vaporized volatile products from which the solid products were separated sufficiently to condense and separate the vaporized volatile product, circulating and cooling a second stream of inert gas, supplying additional gas as required to the second stream from the first after separation of the volatile products therefrom, discharging the separated solids into the second stream, conveying the separated solids therein and finally separating the solids therefrom.

13. The method of recovering a dry product from fermentation residue which comprises spraying the fermentation residue into a concurrent stream of inert gas at a temperature not substantially lower than 900° F. in a distillation zone to distill volatile constituents therefrom and to provide a solid residue, withdrawing the solid residue from the distillation zone suspended in the inert gas and the vaporized volatile products of the distillation, separating the solids from the inert gas and the vaporized volatile products while the temperature is above that at which condensation of the vaporized volatile products can occur, thereafter separating the vaporized volatile products from the inert gas, circulating and cooling a second stream of inert gas, preventing leakage of the vaporized volatile products of the first stream with the separated solids by baffling with a portion of the inert gases of the second stream, discharging the separated solids into the second stream, and finally separating the solids therefrom.

WOLCOTT DENNIS.